United States Patent [19]
Johannesson et al.

[11] Patent Number: 5,878,100
[45] Date of Patent: Mar. 2, 1999

[54] FUEL ASSEMBLY FOR A BOILING WATER REACTOR

[75] Inventors: Sven Birger Johannesson; Olov Nylund, both of Västerås, Sweden

[73] Assignee: ABB Atom AB, Vasteras, Sweden

[21] Appl. No.: 981,050

[22] PCT Filed: May 24, 1996

[86] PCT No.: PCT/SE96/00674

§ 371 Date: Feb. 19, 1998

§ 102(e) Date: Feb. 19, 1998

[87] PCT Pub. No.: WO97/02577

PCT Pub. Date: Jan. 23, 1997

[30] Foreign Application Priority Data

Jun. 30, 1995 [SE] Sweden .................................. 9502374

[51] Int. Cl.[6] .................................................. G21C 3/32
[52] U.S. Cl. .................. 376/435; 376/440; 376/451; 376/454; 376/433
[58] Field of Search ..................................... 376/433, 435, 376/440, 451, 454, 900

[56] References Cited

U.S. PATENT DOCUMENTS

| | | | |
|---|---|---|---|
| 5,219,519 | 6/1993 | Matzner | 376/412 |
| 5,229,068 | 7/1993 | Johansson et al. | 376/371 |
| 5,416,812 | 5/1995 | Matzner | 376/371 |

*Primary Examiner*—Daniel D. Wasil
*Attorney, Agent, or Firm*—Pollock, Vande Sande & Amernick

[57] ABSTRACT

A fuel assembly for a boiling water reactor comprises a plurality of first full-length fuel rods arranged in an orthogonal lattice, wherein each fuel rod is included in two rows of fuel rods perpendicular to each other, and a number of second fuel rods arranged in parallel with the first fuel rods and having the length considerably smaller than the length of the first fuel rods. The second fuel rods are arranged in the lower part of the fuel assembly in the space which is formed between a number of first fuel rods located adjacent to each other, that is, in a position which does not belong to the orthogonal lattice.

7 Claims, 5 Drawing Sheets

FUEL ASSEMBLY FOR A BOILING WATER REACTOR

TECHNICAL FIELD

The present invention relates to a fuel assembly for a boiling water reactor comprising a bottom tie plate, an upper retaining member, a plurality of first fuel rods extending from the bottom tie plate to the upper retaining member and arranged in an orthogonal lattice, a number of second fuel rods arranged in parallel with the first fuel rods and having a length essentially less than the length of the first fuel rods, a number of spacers for keeping the fuel rods in their positions, and a fuel channel which surrounds the fuel rods.

BACKGROUND OF THE INVENTION

In a boiling water reactor, the fuel is in the form of fuel rods, each comprising a stack of pellets of a nuclear fuel arranged in a cladding tube. A fuel bundle comprises a plurality of fuel rods arranged in parallel with each other in a definite symmetrical pattern, i.e., 2, so-called lattice. Usually, the fuel rods are arranged in an orthogonal lattice, that is, each fuel rod is included in two rows of fuel rods arranged perpendicular to each other. By a fuel rod position is meant a position in the lattice. The fuel rods are retained at the top by an upper retaining member, for example a top tie plate, and at the bottom by a bottom tie plate. To keep the fuel rods spaced apart from each other and to prevent them from bending or vibrating when the reactor is in operation, a number of spacers are distributed along the fuel bundle in the longitudinal direction of the fuel assembly. A fuel rod comprises one or more fuel bundles, each extending along the main part of the length of the fuel assembly and being surrounded by a substantially square fuel channel.

The core is immersed into water which serves both as a coolant and as a neutron moderator. During operation, the water flows upwardly in the fuel assembly, whereby part of the water is transformed into steam. As a moderator, steam is inferior to water because of the lower density of steam. During operation, therefore, the moderation of the upper part of the feul assembly is not as good as that in its lower part. If the fuel is distributed uniformly along the longitudinal direction of the fuel assembly, a lower moderator/fuel ratio is obtained in the upper part compared with that in the lower part. A fuel assembly with a non-uniform moderator/fuel ratio has an inferior reactivity during operation, which contributes to an inferior fuel economy compared with a fuel assembly which has a uniform moderator/fuel ratio. To obtain a more uniform moderator/fuel ratio when the reactor is hot, the amount of fuel should thus be smaller and the lattice space, that is, the free space between the fuel rods, should be larger in the upper part of the fuel assembly than in its lower part. For a certain fuel design, a more uniform moderator/fuel ratio may be achieved, for example, by selection of the diameter of the fuel rods, the distance between the fuel rods, and the number of fuel rods.

One way of increasing the moderator/fuel ratio in the upper part of the fuel assembly is to replace some of the fuel rods in the lattice with part-length fuel rods. Part-length fuel rods extend from the bottom tie plate towards the top tie plate but terminate somewhat below the top tie plate in contrast to top full-length fuel rods which extend from the bottom tie plate to the top tie plate. U.S. Pat. No. 5,229,068 discloses a fuel assembly in which the majority of the fuel rods are full-length rods and a minor number of the fuel rods are part-length rods. All the fuel rods in the fuel assembly, that is, both the full-length and the part-length rods, are arranged in an orthogonal lattice in which each rod is included in two rows of fuel rods perpendicular to each other. The distance between two adjacent fuel rods is the same irrespective of whether the fuel rod is a full-length rod or a part-length rod.

One disadvantage of having part-length fuel rods in certain fuel rod positions is that the lattice in the upper part of the fuel assembly becomes uneven with large openings. Because of the low flow resistance of the openings, part of the water which would otherwise have flown between the fuel rods will instead flow in these openings. This results/sin inferior cooling of certain fuel rods and in increased risk of dryout and possible fuel damage.

Another disadvantage is that the total length of all the fuel rods is reduced compared with a fuel assembly with full-length fuel rods in all fuel rod positions. This results in an increase of the linear load (power/unit of length) of the fuel rods, which in turn increases the temperature of the fuel and also increases the risk of PCI damage (PCI=Pellet-Clad Interaction) to the fuel while at the sane time increasing the emission of fission gases.

An additional disadvantage are the peaks in the neutron flux which arise at the top of the part-length fuel rods. The neutron flux peaks arise because the top part of the part-length fuel rods includes parts which neither contain any uranium nor any water. These parts are made up of the fission gas space and the top plug. In these uranium-free and moderator-free parts, no neutron absorption takes place, thus providing a surplus of neutrons which are instead absorbed in the uppermost fuel pellets in the part-length fuel rod and hence cause a power peak.

SUMMARY OF THE INVENTION

The object of the invention is to provide a fuel assembly for a boiling water reactor which has a uniform moderator/fuel ratio and which provides a possibility of optimizing the fuel distribution, both axially and radially, involves a low dryout risk, involves a low linear load on the fuel rods, and does not cause peaks in the neutron flux.

According to the invention, a fuel assembly is provided which satisfies the above-mentioned objects by the arrangement of a number of full-length fuel rods in fuel-rod positions in an orthogonal lattice wherein each rod is included in two rows of fuel rods perpendicular to each other. A full-length fuel rod in a fuel-rod position in the orthogonal lattice will hereinafter be referred to as a normal rod. One or more short fuel rods, that is, fuel rods which extend between two spacers or between the bottom tie plate and a spacer, are arranged in the lower part of the fuel assembly in the space which is formed between a number of normal rods located adjacent to each other, that is, in a position which does not belong to the orthogonal lattice. These short fuel rods which do not belong to the orthogonal lattice will hereinafter be referred to as intermediate rods. The distance between the center line of an intermediate rod and the centre line of the surrounding normal rods is considerably smaller than the distance between the center line of each one of the normal rods. In a preferred embodiment, the intermediate fuel rod is arranged to be in contact with the four adjacent normal rods.

Because the fuel-rod positions are occupied by full-length fuel rods, a uniform lattice is obtained at the upper part of the fuel assembly, whereby the risk of dryout is considerably smaller than in the case of part-length fuel rods in the fuel-rod positions where large openings were formed at the upper part of the fuel assembly. To increase the amount of moderator in the upper part of the fuel assembly, the fuel rods must have a somewhat smaller diameter compared with the fuel rods in a fuel assembly with part-length rods.

In a fuel assembly according to the invention, the total length of the fuel rods increases, instead of decreasing as in the case of part-length fuel rods in fuel-rod positions. In this way, the linear load on the fuel rods decreases, which reduces risk of PCI damage and development of fission gas.

Neutron flux peaks caused by the uranium-free and moderator-free parts of the intermediate fuel rod are suppressed by the four surrounding normal rods which absorb the surplus of neutrons.

By varying the number of short fuel rods at different levels in the fuel assembly, a uniform moderator/fuel ratio can be achieved. The invention provides great possibilities of optimization, both radially and axially in the fuel assembly.

BRIEF DESCRIPTION OF THE DRAWINGS

FIG. 2c shows a horizontal section C—C through the fuel assembly in FIG. 1.

FIGS. 5a and 5b show alternative devices for rotatably supporting the intermediate fuel rod against the bottom tie plate or against the spacer, and.

DETAILED DESCRIPTION OF THE PREFERRED EMBODIMENTS

Figure 1:
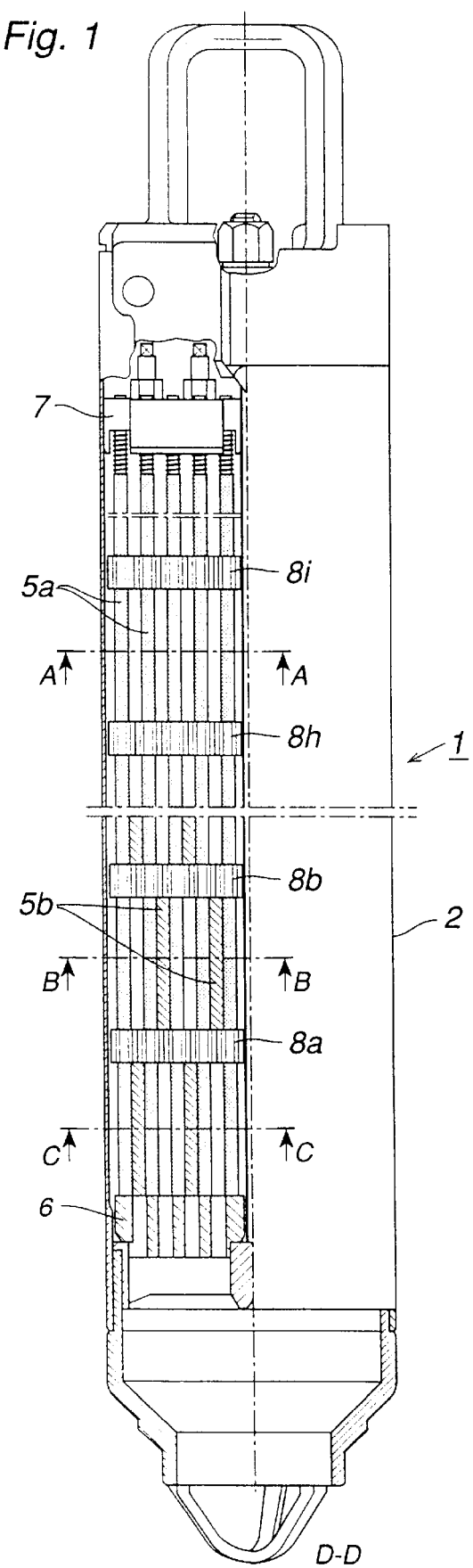
FIG. 1 schematically shows a fuel assembly according to the invention comprising intermediate fuel rods in a vertical section through the line D—D in FIG. 2.

FIG. 1 and FIGS. 2a–2c show a boiling-water fuel assembly 1 which comprises a long tubular container with a rectangular cross section, referred to as a fuel channel 2. The fuel channel 2 is open at both ends to form a continuous flow passage, through which water flows. The fuel channel 2 is provided with a hollow support means 3a, 3b of cruciform cross section, which is secured to the four walls of the fuel channel. The support means consist of four hollow wings 3a and a hollow enlarged cruciform center 3b. The support means 3a, 3b form a cruciform vertical channel through which water flows upwardly through the fuel assembly. The fuel assembly is surrounded by water. Because of the proximity to a major water volume, fuel rods near the fuel channel and near the cruciform channel receive a better moderation than other fuel rods.

The fuel channel with support means surround four vertical channel-formed parts 4a–4d, so-called sub-channels, with a substantially square cross section. Each sub-channel contains a fuel bundle comprising a plurality of fuel rods arranged in parallel. Each fuel rod comprises a number of cylindrical pellets of uranium dioxide, stacked on top of each other and enclosed in a cladding tube. The fuel bundle is retained at the top by a top tie plate 7 and at the bottom by a bottom tie plate 6. The fuel rods are kept spaced apart from each other by means of a plurality of spacers 8a–8i and are prevented from bending or vibrating when the reactor is in operation. The figure shows only four of the spacers 8a, 8b, 8h, 8i. The spaces between the fuel rods within each sub-channel are passed by water and steam. Instead of the top tie plate retaining the fuel bundle, this bundle may be retained at the top by a spacer.

The fuel rods are of two different types, namely, so-called normal rods 5a and so-called intermediate rods 5b. The normal rods 5a are full-length rods, that is, they extend from the bottom tie plate 6 to the top tie plate 7 and they are arranged in an orthogonal lattice. Each fuel bundle comprises 24 normal rods arranged in an orthogonal 5×5 lattice in which a fuel rod is missing in the corner facing the enlarged cruciform centre 3b of the support means. The intermediate rods 5b are shorter than the normal rods and are arranged between the normal rods. The intermediate rods extend either between the bottom tie plate 6 and a spacer 8a or between two spacers, for example 8a and 8b. The intermediate rods 5b are arranged in the lower part of the fuel assembly which constitutes about 60% of the total length of the fuel assembly. In this part of the fuel assembly, the risk of dryout is very low. Most of the intermediate rods 5b are arranged in the space formed between four normal rods located adjacent to each other. Some intermediate rod is arranged in the space which is formed between three normal rods, located adjacent to each other, and the enlarged cruciform centre 3b.

Figure 2A:
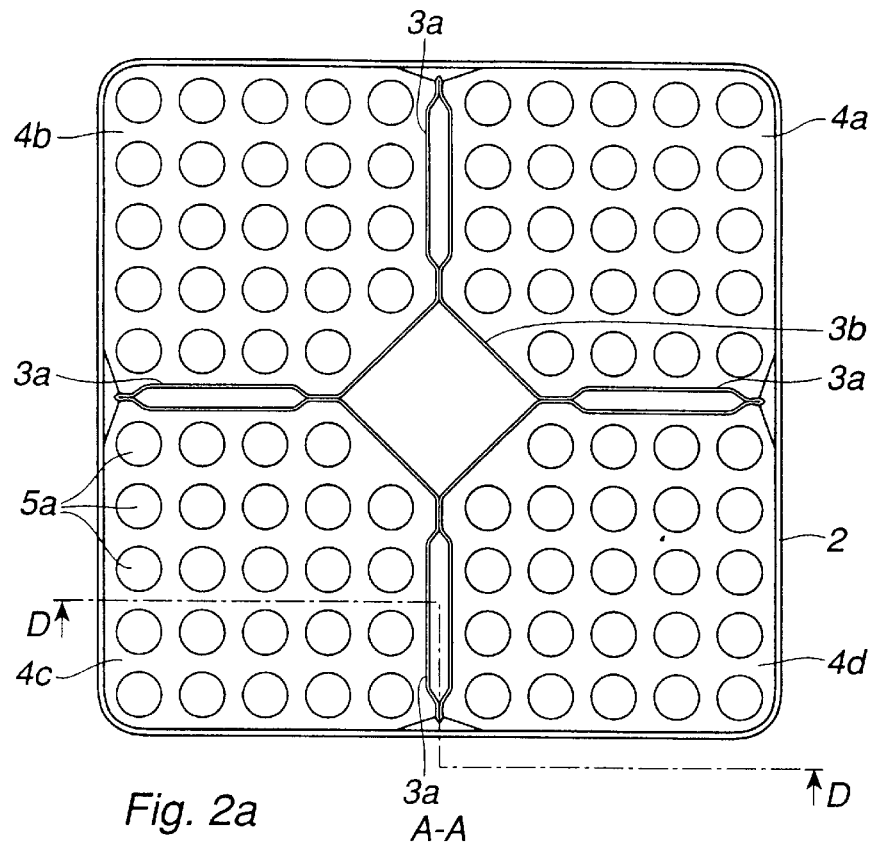
FIG. 2a shows a horizontal section A—A through the fuel assembly in FIG. 1.

FIG. 2a shows a horizontal section through the upper part of the fuel assembly which constitutes about 40% of the total length of the fuel assembly. In the upper part there are no intermediate rods but only normal rods.

Figure 2B:
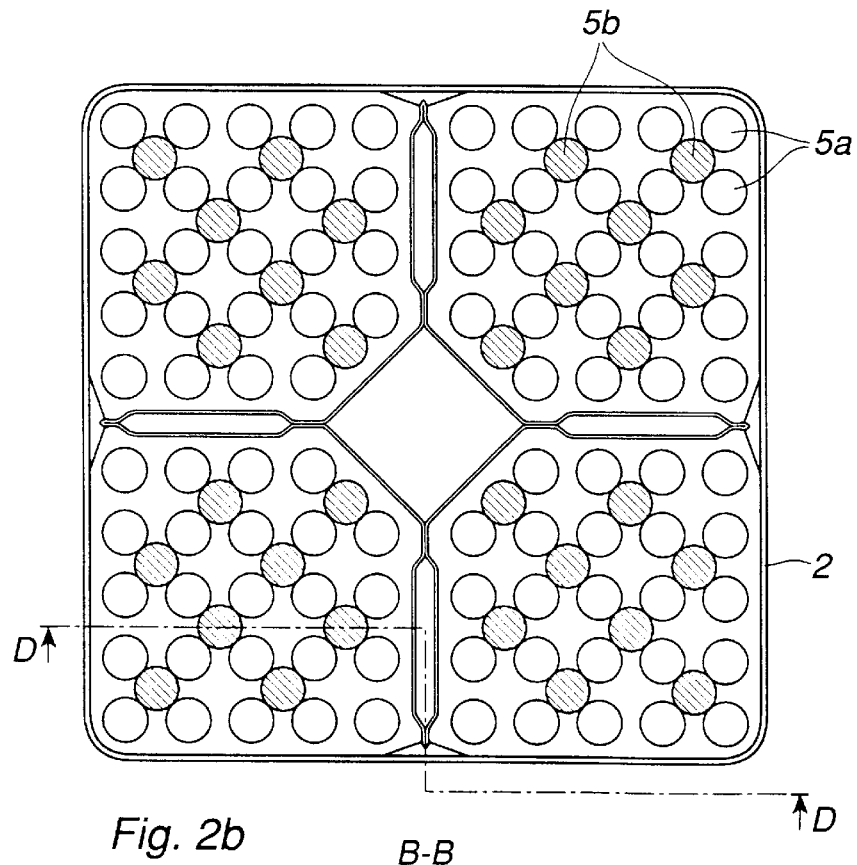
FIG. 2b shows a horizontal section B—B through the fuel assembly in FIG. 1.

FIG. 2b shows a horizontal section through the fuel assembly between the lowermost spacer 8a and its nearest spacer 8b. In each of the four fuel bundles, eight intermediate rods Sb are arranged in spaces between the normal rods and in positions which are evenly distributed over the fuel bundle.

FIG. 2c shows a horizontal section through the fuel assembly between the bottom tie plate 6 and the lowermost spacer 8a. In each of the four fuel bundles, eight intermediate rods 5b are arranged in spaces between the normal rods and in positions which are evenly distributed over the fuel bundle. These positions differ from the positions in FIG. 2b. The positions of the intermediate rods vary in the axial direction between different spacers. In this embodiment, the intermediate rods have alternate positions according to the section in FIG. 2b and positions according to the section in FIG. 2c between the spacers in the lower part of the fuel assembly. By axially varying the positions of the intermediate rods, the intermixture of the water increases, which results in a reduction of the risk of dryout.

Figure 3A:
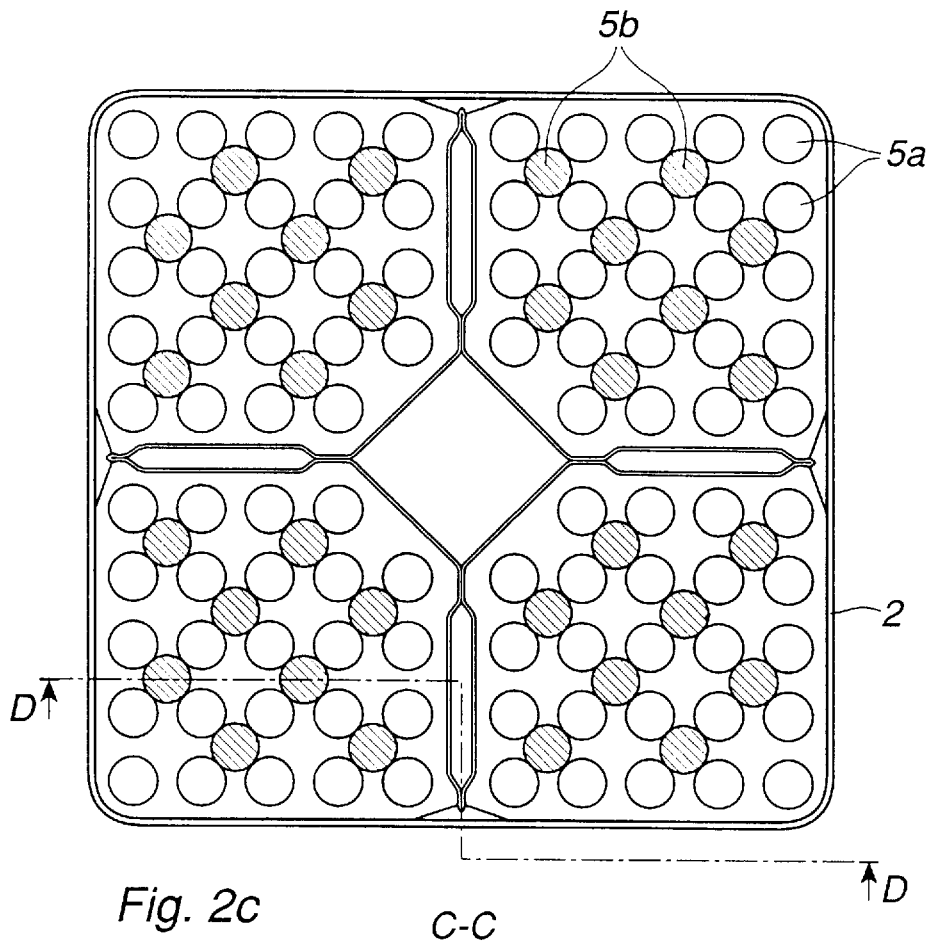
FIG. 3a shows on an enlarged scale an intermediate fuel rod surrounded by four normal rods.
Figure 3A:
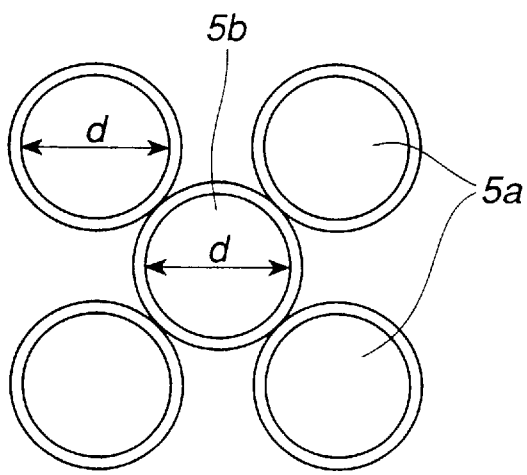

FIG. 3a shows an intermediate rod 5b which is surrounded by normal rods 5a. All the fuel rods have the same diameter d=9 mm. The intermediate rod 5b is arranged so as to be in contact with the surrounding normal rods. By arranging the intermediate rod and the surrounding normal rods as near each other as possible, the risk of vibration and abrasion on the rods is reduced.

Figure 3B:
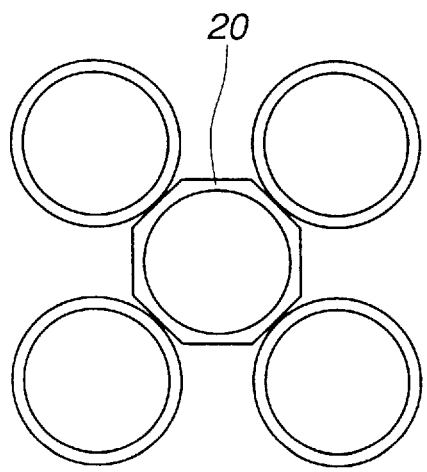
FIG. 3b shows an intermediate fuel rod with an octagonal cladding tube.

FIG. 3b shows an alternative embodiment in which the intermediate rod has an octagonal cladding tube 20 to prevent the formation of a play between the rods. If the intermediate rod is intentionally subjected to a torque, caused by the water flow, the play with respect to the surrounding fuel rods will be eliminated. This counteracts the risk of vibrations and abrasion. Also the top plug is suitably given an octagonal shape.

Figure 4:
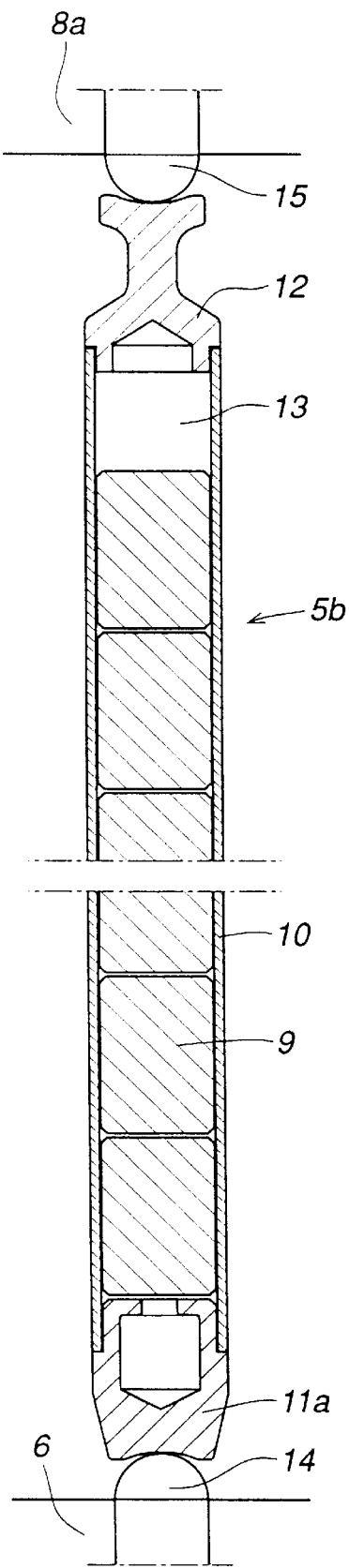
FIG. 4 shows in more detail an intermediate fuel rod.

FIG. 4 shows an intermediate rod 5b arranged between the bottom tie plate 6 and the spacer 8a. The fuel rod comprises a number of uranium pellets 9 stacked on top of each other and enclosed in a cladding tube 10. At its lower end, the fuel rod is sealed by a bottom plug 11a and at its upper end by a top plug 12. The bottom plug is slightly concave and is rotatably arranged on a spherically shaped portion 14 of the bottom tie plate. The top plug is also slightly concave and is pressed against a spherically shaped portion 15 of the spacer. During the burnup of the nuclear fuel, fission gases contained within the fuel rod are released. To prevent the pressure on the cladding from becoming too large, an expansion space 13 for the fission gases is arranged above the uranium pellets. The intermediate rod is kept in position in the lateral direction by the surrounding normal rods. If an intermediate rod, for example during servicing, need to be picked out of the fuel bundle, one of the surrounding normal rods must first be removed, whereafter the intermediate rod may be engaged in the top plug with a suitable tool and be moved out laterally.

Figure 5A:
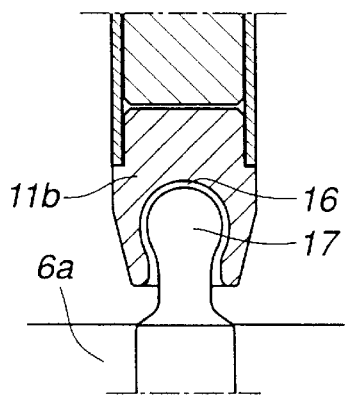
Figure 5B:
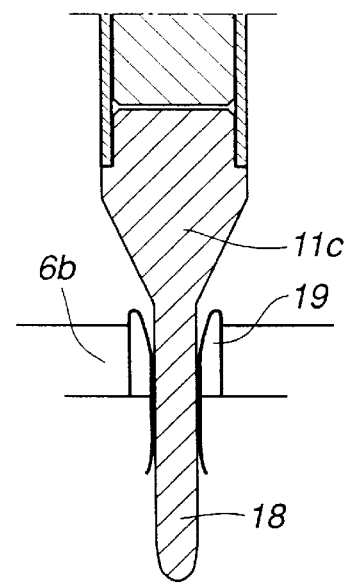

FIG. 5a shows an alternative method of arranging a rotatable support for the bottom plug. The bottom plug 11b comprises a spherical recess 16 which surrounds a resilient ball 17 arranged on the bottom tie plate 6b or, alternatively, on a spacer. FIG. 5b shows an additional method of arranging a rotatable support for the bottom plug. The bottom plug 11c has the shape of a downwardly tapering cone and terminates in a pin 18 which fits into a hole with resilient tabs 19 in the bottom tie plate 6b or in a spacer.

Figure 6A:
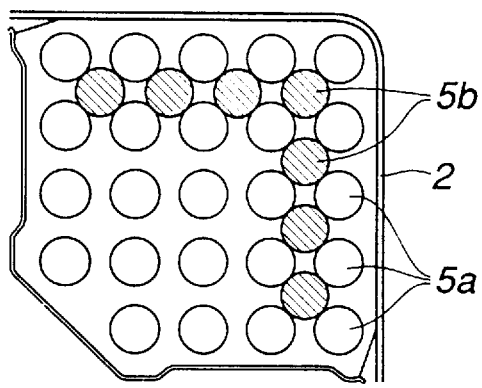
FIGS. 6a–6c show additional embodiments of a fuel assembly according to the invention.

Because of the ample supply of moderator, it may be an advantage to arrange the intermediate rods near the fuel channel and the support means. FIG. 6a shows a section through a sub-channel according to one embodiment of the invention where all the intermediate rods are arranged near the fuel channel. Normal rods 5a are arranged in an orthogonal 5×5 lattice and the intermediate rods 5b are all arranged in the space which is formed between four adjacent normal rods where two of the normal rods adjoin the fuel channel 2. The cross section is the same in the whole lower part of the fuel assembly.

Figure 6B:
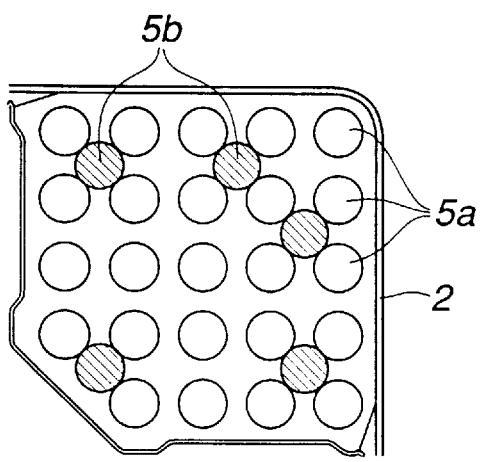
Figure 6C:
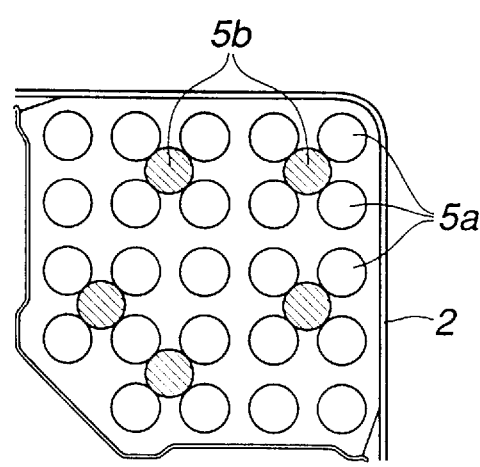

FIGS. 6b and 6c show two horizontal sections through a sub-channel in the lower part of a fuel assembly according to an additional embodiment of the invention. The intermediate rods 5b are arranged in positions near the fuel channel 2 and near the support means 3b. The intermediate rods have alternate positions according to the section in FIG. 6b and positions according to the section in FIG. 6c between the spacers in the lower part of the fuel assembly.

This invention may, of course, also be applied to a fuel assembly which completely lacks an internal water channel or which has a water channel with a different design, for example one or more centrally arranged water pipes.

We claim:

1. A fuel assembly for a boiling water reactor comprising:

a bottom tie plate;

an upper retaining member;

a plurality of first fuel rods extending from the bottom tie plate to the upper retaining member and arranged in an orthogonal lattice wherein each fuel rod is included in two rows of fuel rods perpendicular to each other;

a plurality of second fuel rods arranged in parallel with the first fuel rods and having a length considerably smaller than the length of the first fuel rods;

a plurality of spacers which retain and position the fuel rods in spaced relationship to each other and are axially separated along the fuel rods, and a fuel channel surrounding the fuel rods, wherein each second fuel rod is surrounded by a plurality of first fuel rods, whereby the distance between the second fuel rod and each of the surrounding first fuel rods is considerably smaller than the distance between each of the first fuel rods.

2. A fuel assembly according to claim 1, wherein the second fuel rods are arranged in a lower part of the fuel assembly.

3. A fuel assembly according to claim 1, wherein at least some of the second fuel rods are arranged between the bottom tie plate and any of the spacers.

4. A fuel assembly according to claim 1, wherein at least some of the second fuel rods are arranged between two of the spacers.

5. A fuel assembly according to claim 1, wherein each second fuel rod is adapted to be in contact with the surrounding first fuel rods.

6. A fuel assembly according to claim 1, wherein the second and the first fuel rods have the same diameter.

7. A fuel assembly according to claim 1, wherein the second fuel rods have an octagonal cladding tube.

* * * * *